United States Patent
Janniello

(10) Patent No.: US 6,453,424 B1
(45) Date of Patent: *Sep. 17, 2002

(54) SYSTEM AND METHOD FOR TEMPORALLY CONTROLLING INSTRUCTION EXECUTION

(75) Inventor: James P. Janniello, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/282,712

(22) Filed: Mar. 31, 1999

(51) Int. Cl.[7] .............. G06F 1/04; G06F 1/12; G06F 15/00
(52) U.S. Cl. ............. 713/500; 713/400; 712/223; 712/244; 712/245
(58) Field of Search .................. 712/213, 223, 712/244, 245, 228; 711/137, 183; 710/5, 6; 713/400, 500

(56) References Cited

U.S. PATENT DOCUMENTS

| | | | | |
|---|---|---|---|---|
| 3,928,857 A | * | 12/1975 | Carter et al. ............. | 711/137 |
| 4,445,177 A | * | 4/1984 | Bratt et al. ............... | 712/245 |
| 5,075,849 A | * | 12/1991 | Kuriyama et al. ......... | 711/200 |
| 5,812,074 A | * | 9/1998 | Chung ..................... | 341/67 |
| 5,933,626 A | * | 8/1999 | Mahalingaiah et al. .... | 712/227 |
| 5,944,841 A | * | 8/1999 | Christie .................... | 714/38 |
| 6,018,776 A | * | 1/2000 | Wise et al. ................ | 710/7 |
| 6,041,345 A | * | 3/2000 | Levi et al. ................. | 709/217 |
| 6,088,784 A | * | 7/2000 | Choquette ................. | 712/32 |
| 6,167,479 A | * | 12/2000 | Hartnett et al. ............ | 710/260 |
| 6,205,250 B1 | * | 3/2001 | Kranawetter ............... | 382/232 |
| 6,263,019 B1 | * | 7/2001 | Ryan ..................... | 375/240.02 |
| 6,278,735 B1 | * | 8/2001 | Mohsenian ................ | 375/240 |
| 6,292,887 B1 | * | 9/2001 | Janniello ................... | 712/223 |

* cited by examiner

Primary Examiner—Thomas Lee
Assistant Examiner—Chun Cao
(74) Attorney, Agent, or Firm—Louis J. Percello; Fitch, Even, Tabin & Flannery

(57) ABSTRACT

An apparatus and method of controlling instruction execution in the apparatus with a precise temporal execution arrangement. The apparatus may be a processor or microprocessor capable of executing a function specific wait state that is dependant upon a type specified by an instruction field. The processor includes a reference clock counter that maintains the wait count, an instruction parser that strips the wait type and count from instructions and passes the stripped information to a comparator. The comparator compares the stripped information against the wait count. The wait types include: a relative timestamp type indicating execution at some time subsequent to the present cycle; a direct timestamp type indicating an absolute time for execution; and a timestamp range indicating a time period when execution is valid.

20 Claims, 7 Drawing Sheets

SYSTEM AND METHOD FOR TEMPORALLY CONTROLLING INSTRUCTION EXECUTION

BACKGROUND OF THE INVENTION

1. Field of the Invention

The present invention is related to computer processors and, more particularly, to temporally controlling the execution of instructions in a microprocessor or digital signal processor.

2. Background Description

So-called superscalar Microprocessors and Digital Signal Processors operate by sequentially executing instructions which specify the individual operations. These sequential operations can include, for example, adding two numbers, subtracting numbers, multiplying numbers, moving data, performing boolean math, etc. A typical program for a microprocessor is, basically, a sequence of instructions written to perform a particular task.

Some program instructions may reorder instruction execution sequence on the fly. For example, a short sequence of instructions may be executed repeatedly, or under a given set of conditions a block of instructions may be skipped altogether. Typical instructions to modify the sequence of instructions after execution has begun may include, for example, LOOP and JUMP instructions.

Each instruction may include several fields, each of which is necessary to complete execution. These fields may include, for example, the operands for math operations, an address of an operand stored in memory, the register name holding an operand, the location of the next instruction to be executed, the number of times to execute an instruction loop. The processor parses each instruction, to determine instruction type and determine the number of fields in the instruction and the definition of each field. Then, the processor instructs appropriate functional units to execute their operation causing, for example, the addition unit to add two numbers or, causing a multiplier to multiply two numbers. As each instruction is executed, the processor fetches, or reads, the next instruction from memory and executes it.

Instruction execution speed is limited only by the speed of the underlying hardware. Often, however, external events may affect program execution or, the program may be event-driven. These external events may include, for example, striking a key on a keyboard or responding to a flag from a digital timer.

In some instances, program execution must be controlled temporally, or paced. For example, a sample may be read periodically from a monitoring device, such as monitoring combustion within an engine. In this example, a digital timer is programmed to periodically expire and generate a flag to interrupt the processor. Then, the processor begins executing a subroutine to read the monitoring device. This type of program execution is acceptable when timer accuracy and interrupt handling time requirements are not particularly stringent.

However, for applications where those tolerances are such that timing must be within a single microprocessor clock cycle, these prior art program execution methods are no longer acceptable. In particular, these prior art methods are unsatisfactory, for example when temporal precision is important, such as, for video compression/decompression, where large amounts of data may be stored, transported and displayed. Consequently, to reduce the video data volume, redundant information is commonly removed from the video, compressing the video data. Unfortunately, when the redundant information is removed, the temporal characteristic of the video content may be changed with the real-time nature of the video material being lost.

So, normally, to maintain the temporal relationship when the video is decompressed, timestamps are embedded into the video content. A typical timestamp is, essentially, time of day. The timestamps specify when a particular block of video data (most typically, a video frame) should be decompressed and/or displayed. As the video is compressed, the time of day is inserted into the compressed video content. When the video is decompressed, the timestamp is fetched by the decompression processor and provides a guide indicating when the video frame should be displayed. Thus, timestamp information embedded in data controls processor execution, temporally.

The timestamp method described above enables the temporal control of programs, but requires that timestamps be embedded in the content. Accordingly, this prior art method is unsuitable for applications where there is no content or where the time of execution must come from a source other than the content, such as when a master clock defines the execution time.

Another typical prior art method for temporally controlling program execution uses a digital timer. The digital timer is programmed to expire at a particular point in time. The processor is programmed to enter a no-op loop until the digital timer reaches the expiration count. The processor continues executing the no-op loop until the timer reaches the count and issues a flag, indicating the time has expired. The flag signals to the processor to interrupt the loop and to jump to another subroutine or program location.

While this prior art method of temporally controlling program execution is suitable for most current applications, it also is relatively inaccurate, and depends upon the time to initialize the timer and to complete the interrupt operation, which may vary significantly. Furthermore, where precision of a single microprocessor clock cycle is needed, these methods are unacceptable.

SUMMARY OF THE INVENTION

It is a purpose of the invention to enable programmers to precisely control execution timing.

It is another purpose of the present invention to enable programmers to precisely control temporal execution of multimedia computer programs.

The present invention is an apparatus and method of controlling instruction execution in the apparatus with a precise temporal execution arrangement. Accordingly, the preferred apparatus is a processor or microprocessor capable of executing a function-specific wait-state that is dependant upon a type specified by an instruction field. The microprocessor includes a reference clock counter that maintains the wait count, an instruction parser that strips the wait type and count from instructions and passes the stripped information to a comparator. The comparator compares the stripped information against the count. The wait types include: a relative timestamp type indicating execution at some time subsequent to the present cycle; a direct timestamp type indicating an absolute time for execution; and a timestamp range indicating a time period when execution is valid.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
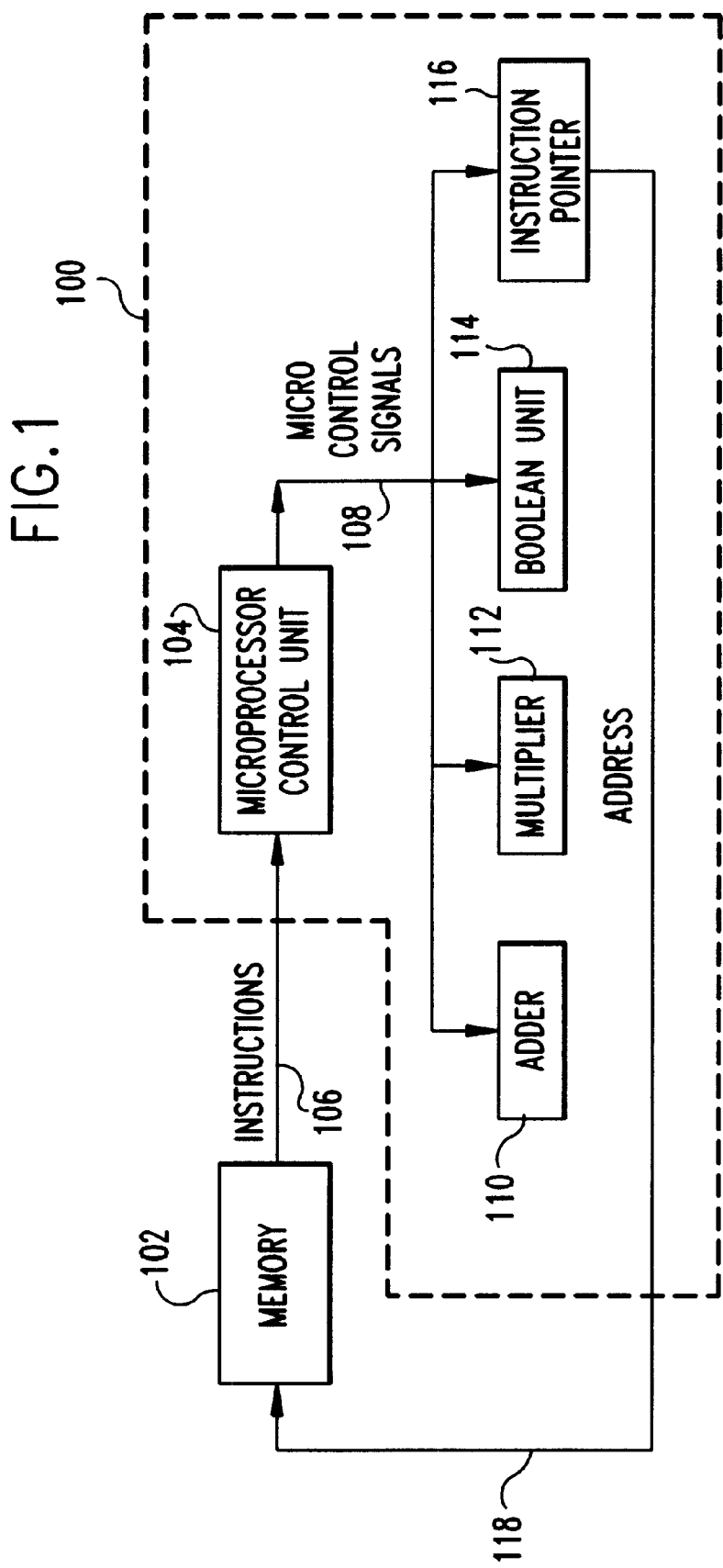
FIG. 1 is a simplified block diagram of a microprocessor and memory.

Referring now to the drawings and, more particularly, FIG. 1, a simplified block diagram of a microprocessor 100 and memory 102. A Microprocessor Control Unit (MPCU) 104 fetches instructions from the memory 102 on instruction bus (Ibus) 106. After parsing the instructions, the MPCU 104 generates Micro Control Signals which are passed on Micro Control Signals bus ($\mu$CSbus) 108 to various functional units 110, 112, 114 and to Instruction Pointer 116, which provides an address on address bus 118 for the next instruction to be executed.

Figure 2:
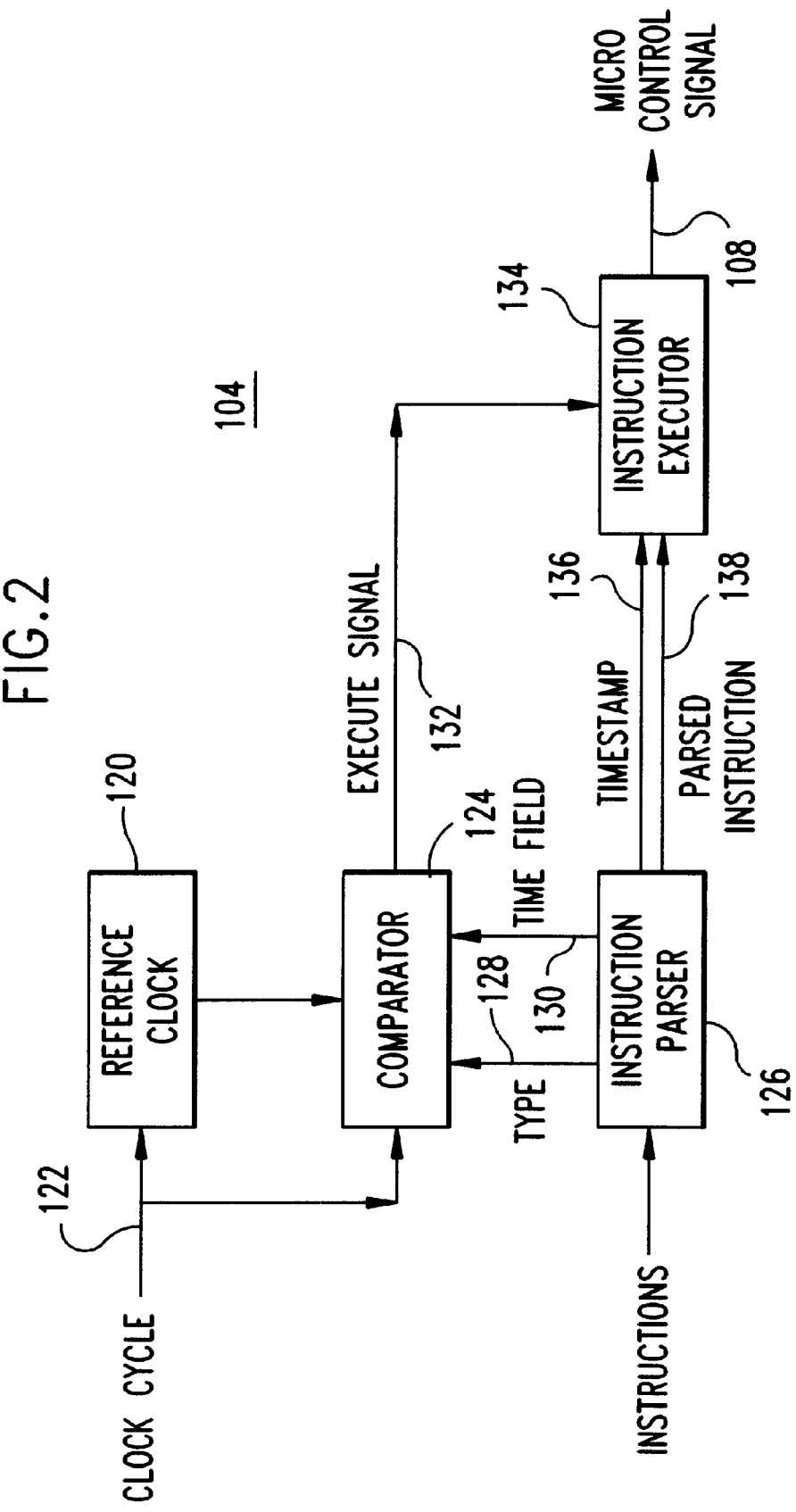
FIG. 2 is a detailed example of a preferred embodiment MPCU.

FIG. 2 is a detailed example of a preferred embodiment MPCU 104. Reference Clock counter 120 is a multi-bit counter that increments on every cycle of the master clock provided at Clock Cycle input 122. The Reference Clock counter 120 is initialized at program start. Comparator 124 monitors the Reference Clock counter 120. Instruction Parser 126 parses instructions, stripping off timestamp information from Timestamped Instructions.

When such a timestamped instruction is encountered, the Instruction Parser 126 strips off a TYPE field and a TIME field, both of which are provided to comparator 124 on lines 128, 130, respectively. The Field Type 128 is combined with the Time field 130 to indicate exactly when to execute the instruction. For the preferred embodiment, there are three possible types: a direct type, a range type and a relative type, although it is contemplated that additional TYPES may be included, if desired. The Comparator 124 continuously compares the TIME Field on lines 130 to the count value in the Reference Clock counter 120.

If the TYPE field 128 indicates a Direct type, then, when the TIME Field on lines 130 equals the Reference Clock count, the Comparator 124 drives an Execute Signal on line 132 active. If they are equal, then, the processor executes the instruction immediately, during the current clock cycle. If they are not equal, the processor executes a no-op and waits until the specified time occurs and, then, drives an Execute Signal on line 132 active.

If the TYPE field 128 indicates a Range type, then, the processor has been given a range of time in which the instruction may be executed. So, when the Reference Clock 120 equals or is between the range limits TIME_L or TIME_H Field on lines 130, the Comparator 124 drives the Execute Signal on line 132 active. The TIME_L field indicates the earliest time at which the instruction may be executed. The TIME_H field indicates the latest time at which the instruction should be executed.

If the TYPE field 128 indicates a Relative type, then, the processor is to execute the instruction some number of clock cycles, as indicated by the TIME field 130, after the current clock cycle.

In response to the Execute Signal on line 132, the Instruction Executor 134, generates Micro Control Signals from the Timestamp on line 136 in combination with the parsed instruction on lines 138. The Instruction Executor 134 places the Micro Control Signals on $\mu$CSbus 108 and selectively activates Functional Units 110, 112 and 114. If the Timestamp signal line 136 is active indicating the instruction contains a timestamp, the Instruction Executor 134 does not activate the Micro Control Signals on $\mu$CSbus 108 until the Execute Signal is active; otherwise, the Micro Control Signals on $\mu$CSbus 108 are activated immediately.

In one preferred embodiment, the Instruction Executor 134 is a microprogram read only memory ($\mu$P ROM) providing the Micro Control Signals on $\mu$CSbus 108. The Timestamp on line 136 in combination with the parsed instruction on lines 138 are address lines of the ROM, addressing microcoded instructions. Alternately, the Timestamp on line 136 may be combined, logically, with the parsed instruction on lines 138 to generate microinstruction addresses.

Figure 3:
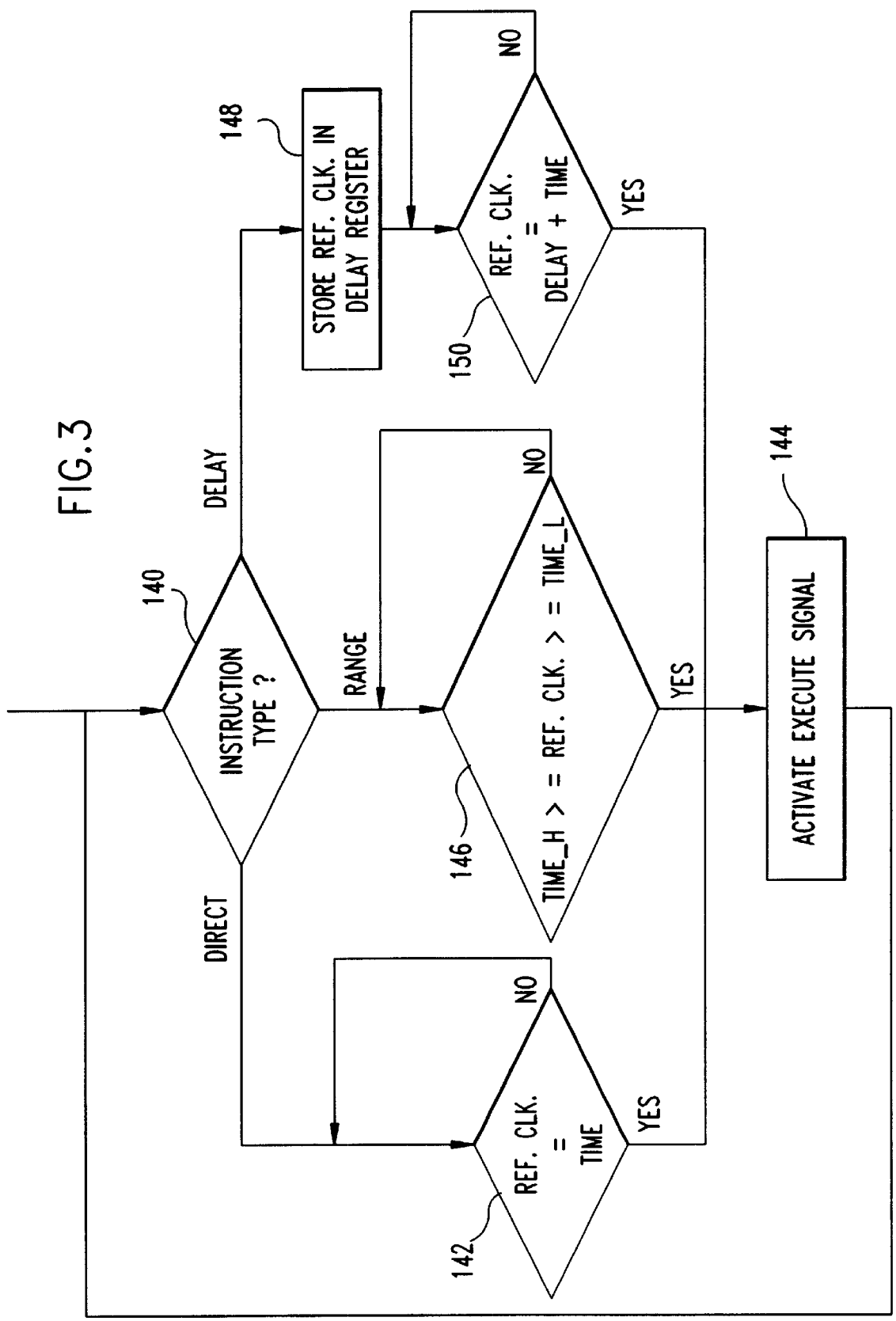
FIG. 3 is a flow chart of Comparator 124 operation.

FIG. 3 is a flow chart of Comparator 124 operation. When a timestamped instruction is received, on each cycle of master clock 122, in step 140, the Comparator 120 checks the Instruction Type field 128 to determine the type of timestamp, i.e., Direct, Range or Delay. Preferably, the Instruction Type field 128 is a two bit field that indicates the type of timestamp. The Instruction Type determines the decision path that is taken.

If, in step 140, the timestamp type is Direct, then in step 142, the count of Reference Clock counter 120 is compared to the Time Field 130. If the comparison shows that the Reference Clock counter 120 count is not equal to the Time Field 130, the check is repeated until they are equal. When they are equal, the Execute Signal 132 is activated in step 144.

If, in step 140, the timestamp type is Range, then in step 146, the count of Reference Clock counter 120 is compared to two components of the Time Field 130 providing an upper range limit (TIME_H) and a lower range limit (TIME_L). If the count is not between the range limits, the processor pauses, looping in step 146 until the count reaches one limit or the other. Once the count is between the range limits, the Execute Signal 132 is activated in step 144.

If, however, in step 140, the timestamp type is Delay, then in step 148, the value of the Reference Clock counter 120 is stored in the DELAY register in the Comparator 124. Then, in step 150, the processor pauses, looping until the delay period has expired, i.e., the clock count reaches the stored DELAY register value plus the delay. Once the delay has passed, the Execute Signal 132 is activated in step 144.

Figure 4:
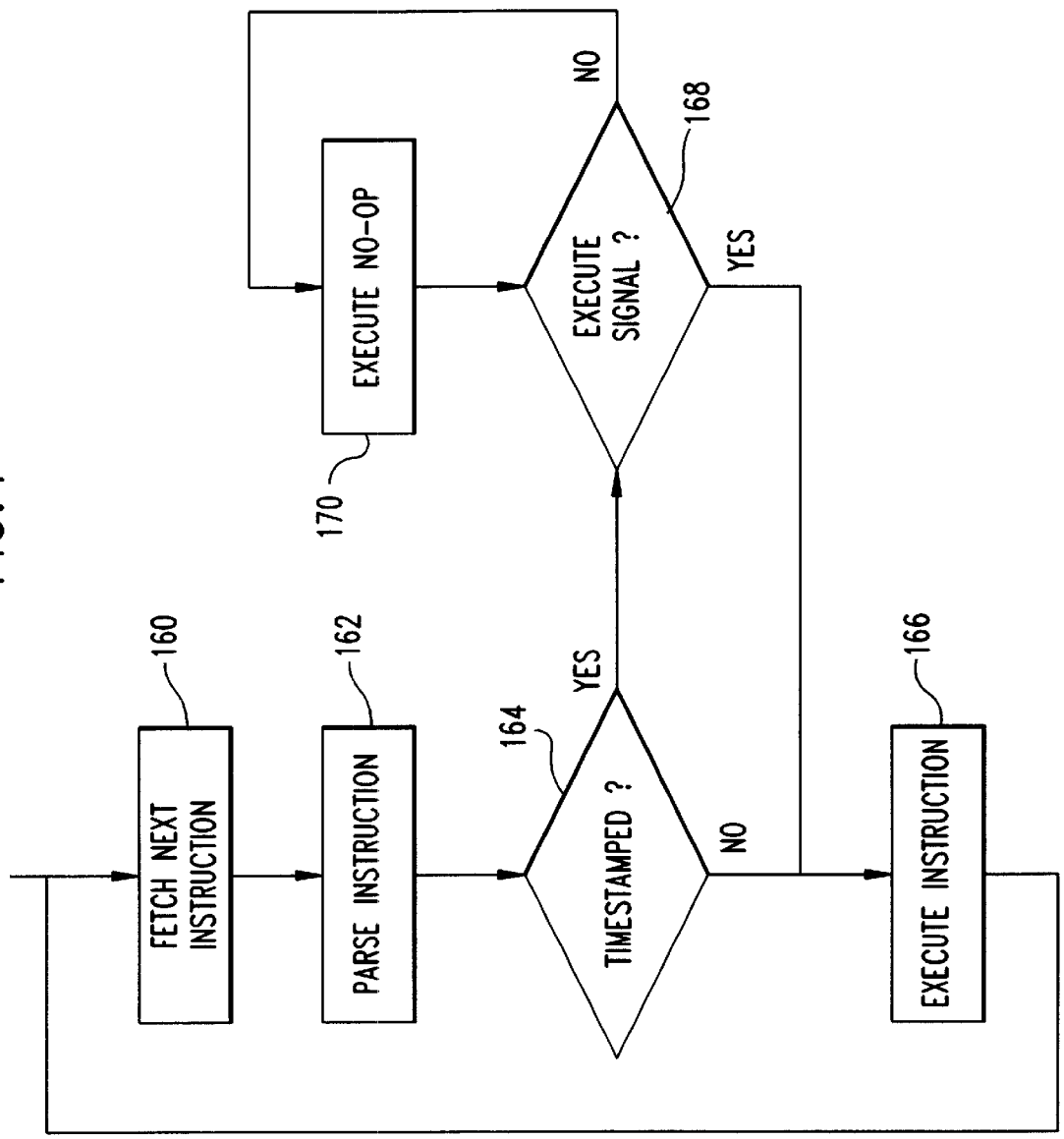
FIG. 4 is a flow chart of the MPCU operation.

The MPCU 104 uses the Execute Signal 132 to determine when a timestamped instruction should be executed. FIG. 4 is a flow chart the MPCU 104 operation. First, in step 160, the MPCU 104 fetches an instruction from the memory 102. In step 162, the instruction is parsed and, in step 164, the instruction is checked for a timestamp. If the instruction is not timestamped, then in step 166 the instruction is executed. Otherwise, if the instruction is timestamped, then in step 168, the Execute Signal is tested. If the Execute Signal is not active, then in step 170, a delay is inserted by executing a No-op. After the No-op, in step 168, the Execute Signal is tested again. When the Execute Signal is found to be active in the test of step 168, then, in step 166, the instruction is executed.

Figure 5:
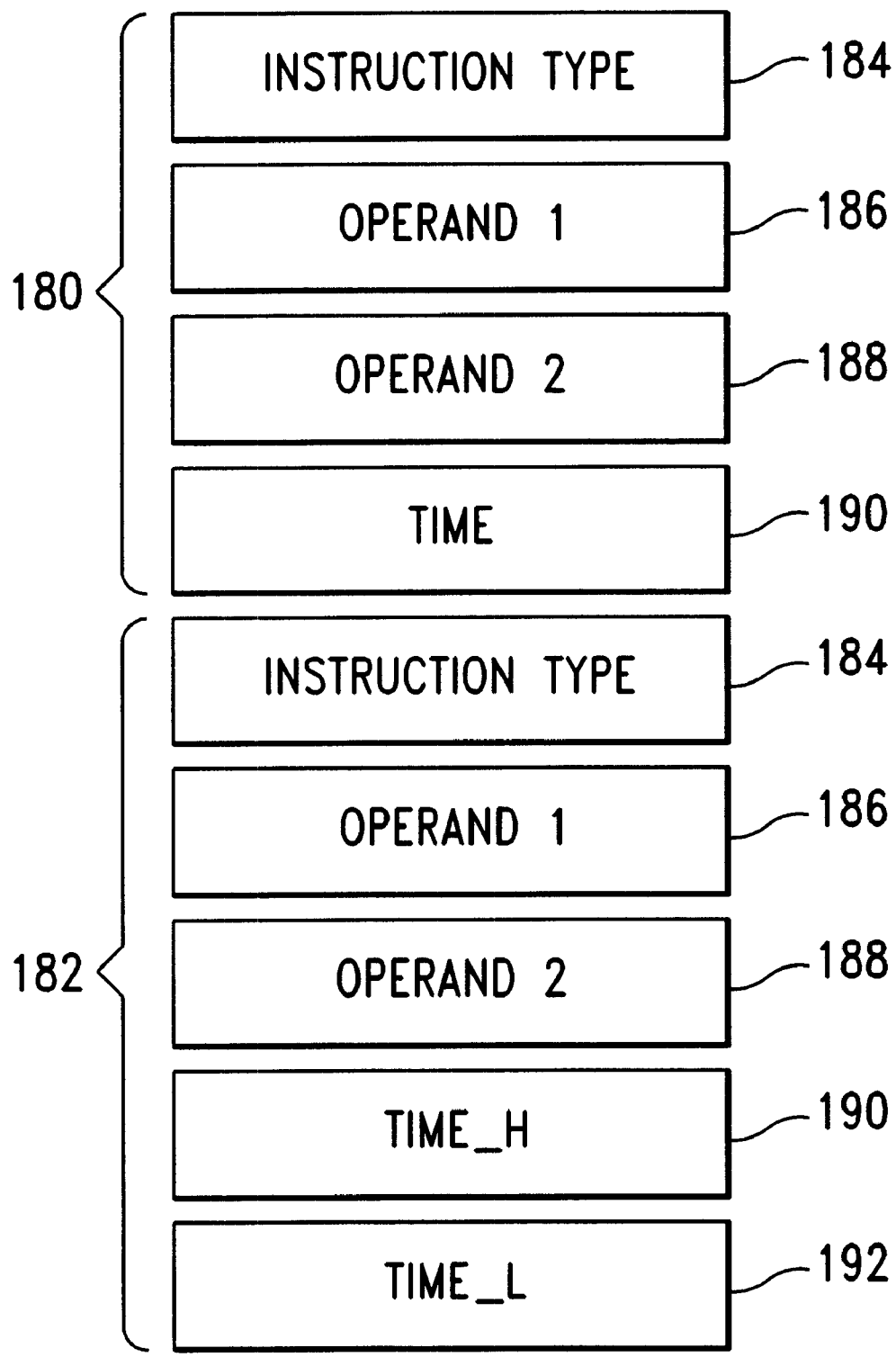
FIG. 5 shows the fields of two timestamped instructions.

FIG. 5 shows the fields of two timestamped instructions 180, 182. The first field of each instruction 180, 182 is the Type Field 184 that indicates the type of operation to be performed and whether the particular instruction is timestamped. The immediately following fields of a timestamped instruction 180, 182 are the operand fields 186, 188, providing the operation to be performed. The last field in a timestamped instruction 190, 192 is(are) the Time field(s) 190(, 192). The first instruction 180, which is a Direct or Delay timestamped instruction, includes a single number in a single Time field 190. The second instruction 182, which is a Range timestamped instruction, includes a pair of number in Time fields 190, 192.

Figure 6:
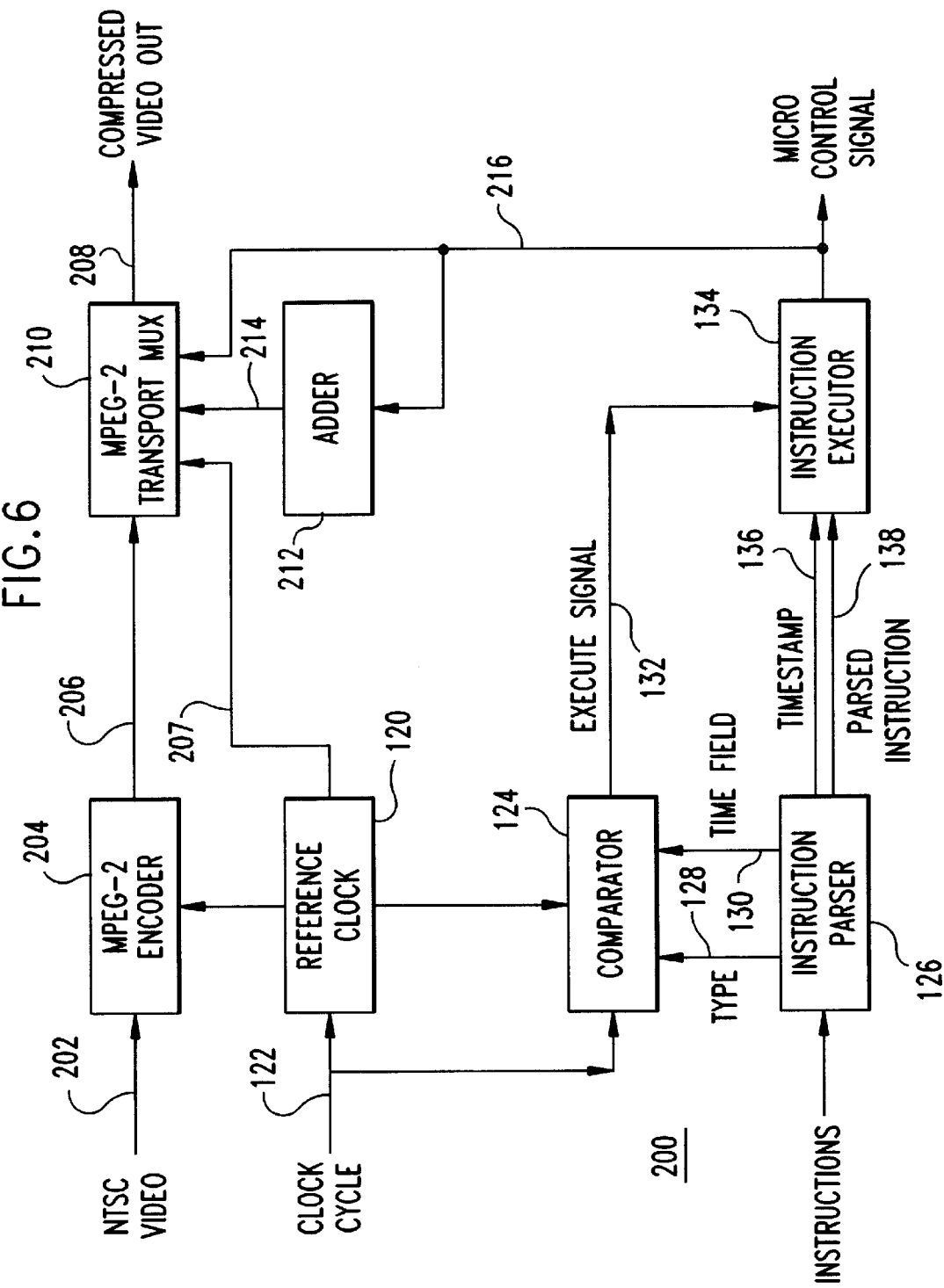
FIG. 6 is an example of a data broadcasting subsystem for Digital Television according to the preferred embodiment of the present invention.
Figure 7:
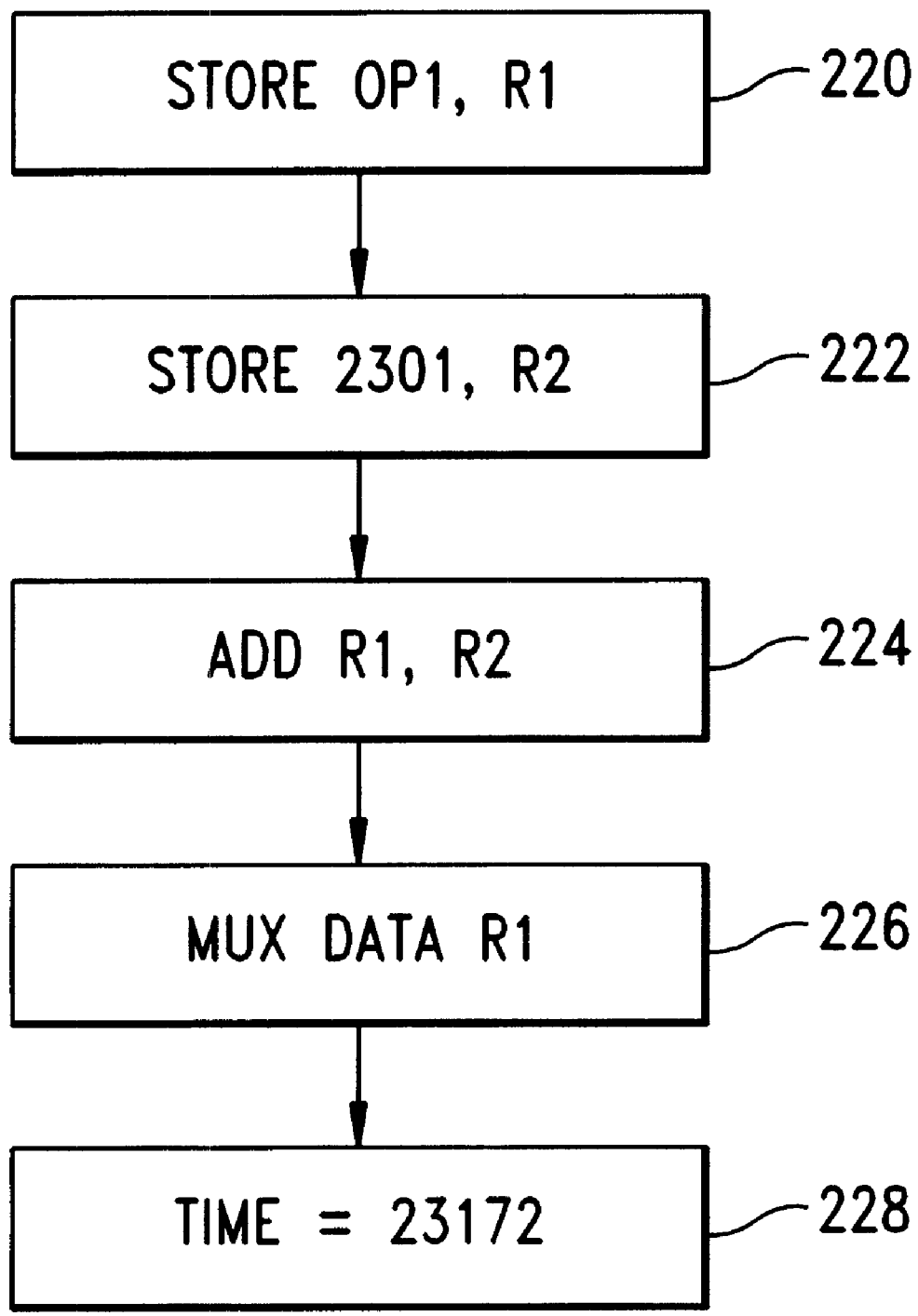
FIG. 7 shows representative steps in encoding broadcast data in the Digital Television example of FIG. 6.

FIG. 6 is an example of a data broadcasting subsystem 200 for Digital Television according to the preferred embodiment of the present invention including a MPCU 104 as in FIG. 2 with like elements labeled as in FIG. 2. FIG. 7 shows representative steps in encoding broadcast data in the Digital Television example of FIG. 6 according to the preferred embodiment of the present invention.

In this Digital Television embodiment example, NTSC video signals at input 202 are encoded in Motion Picture Experts Group—second version (MPEG-2) encoder 204 providing compressed video at output 206. MPEG-2 is a well known standard in the art. As the video is compressed in MPEG-2 encoder 204, the Reference Clock counter 120 provides Program Clock References (PCR) 207, i.e., time synchronized data or information, that is periodically inserted into the output compressed video stream output 208 at the proper time.

MPEG-2 encoder 204 is continuously compressing video signals 202 and providing the results 206 to MPEG-2 transport Mux 210. Simultaneously, MPCU 104 is executing the program of FIG. 7 to generate synchronized information (or data) to be embedded in the encoded output 208. Adder 212 combines data from registers or memory and the result 214 is provided to MPEG-2 transport Mux 210 in response to control from $\mu$CS 216.

Thus, with reference to FIG. 7, in step 220, a first operand, Operand 1 is stored in a first register, Register R1. Next, in step 222, a random number, 2301 in this example, is stored in a second register, Register R2. Then, in step 224 Adder 212 adds the data stored in MCPU Registers R1 and R2 (not shown) and, stores the result in Register R1. Then, in step 226, the result, previously stored in Register R1, is inserted into the compressed data as it is passes through MPEG-2 Mux 210 according to the instruction's time field, 23172 in this example. Thus, when the PCR 120 equals 23172 the result is inserted.

When each new instruction is provided, the Instruction Parser 126 sends the instruction TYPE 236 and the Time Field(s) 130 to the Comparator 124. The Clock Cycle signal 122 continuously increments the PCR counter 120 as the Comparator 124 continuously compares the count to the Time Field(s) 120 and generates an Execute Signal 132, when they are equal. The Instruction Executor 134 responds to the Execute Signal 132 by generating the appropriate Micro Control Signals. As a result, the MPEG-2 Mux 210 inserts the synchronized data into the compressed video stream output 208.

While the invention has been described in terms of preferred embodiments, those skilled in the art will recognize that the invention can be practiced with modification within the spirit and scope of the appended claims.

I claim:

1. A processor for a data processing system, said processor comprising:

a multi-bit clock counter;

an instruction parser receiving instructions and parsing an instruction type and at least one time field indicating an instruction execution time from said received instructions;

a comparator comparing a count from said multi-bit clock counter with said instruction execution time, said instruction type indicating a relationship between said count and each said at least one time field; and a process control unit executing parsed instructions responsive to said instruction execution time.

2. A processor as in claim 1, wherein said instruction type is a range type and said at least one time field is a pair of time fields indicating a range of time.

3. A processor, as in claim 2, wherein one of said pair is an earliest instruction execution time and the other of said pair is a lastest instruction execution time.

4. A processor as in claim 1, wherein said instruction type is a direct type and said at least one time field is a single field indicating instruction execution time.

5. A processor as in claim 1, wherein said instruction type is a relative type and said at least one time field is a single field indicating a delay time prior to instruction execution.

6. A processor as in claim 1, wherein said processor is a microprocessor.

7. A processor as in claim 1, wherein when each of said parsed instructions are executed, data is synchronously inserted chronologically into a data stream.

8. A processor as in claim 1, wherein said processor is a digital signal processor.

9. A method of operating a processing unit in a computer system, said method comprising:

fetching an instruction;

checking said instruction for an instruction type; and when said instruction is found to include a type, parsing said instruction to form a parsed instruction and a timestamp; and executing said parsed instruction at a time determined by said instruction type and a time field in said instruction.

10. A method as in claim 9 wherein when said instruction type is a direct type, said parsed instruction execution time is provided by said time field.

11. A method as in claim 9 wherein when said instruction type is a relative type, said parsed instruction execution time is delayed by a period determined by said time field.

12. A method as in claim 9 wherein when said instruction type is a range type, said parsed instruction execution time is designated by a period, said period being determined by said time field.

13. A microprocessor for a video processing comprising:

at least one logic unit;

an MPEG transport mux; and a microprocessor control unit controlling said at least one logic unit and said MPEG transport mux, said microprocessor control unit comprising:

a multi-bit clock counter, an instruction parser receiving instructions and parsing from said received instructions an instruction type and at lest one time field indicating an instruction execution time, a comparator comparing a count from said multi-bit clock counter with said instruction execution time, said instruction type indicating a relationship between said count and each said at least one time field, and a process control unit executing parsed instructions responsive to said instruction execution time.

14. A microprocessor as in claim 13, wherein at least one logic unit includes at least one arithmetic unit.

15. A microprocessor as in claim 13, further comprising:

a MPEG encoder receiving a video signal, encoding said received signal as MPEG encoded data and passing said encoded data to said MPEG transport mux.

16. A microprocessor as in claim 15, wherein said instruction type is a range type and said at least one time field is a pair of time fields indicating a range of time.

17. A microprocessor as in claim 16, wherein one of said pair is an earliest instruction execution time and the other of said pair is a latest instruction execution time.

18. A microprocessor as in claim 15, wherein said instruction type is a direct type and said at least one time field is a single field indicating instruction execution time.

19. A microprocessor as in claim 15, wherein said instruction type is a relative type and said at least one time field is a single field indicating a delay time prior to instruction execution.

20. A microprocessor as in claim 15, wherein when each of said parsed instructions are executed, data is synchronously inserted chronologically into a data stream.

* * * * *